United States Patent [19]

Cresswell et al.

[11] 4,404,969

[45] Sep. 20, 1983

[54] RESPIRATORS

[76] Inventors: Arnold W. Cresswell, 132, Prospect Rd., Farnborough, Hampshire; John Ernsting, 21, Wellington Ave., Fleet, Hampshire; James A. Turnbull, "Coppice", Ash Green Rd., Ash, Aldershot, Hampshire; Waldemar E. Voss, "Blandings", Potter Street Hill, Pinner, Middlesex, all of England

[21] Appl. No.: 959,100

[22] Filed: Nov. 9, 1978

[30] Foreign Application Priority Data

Nov. 11, 1977 [GB] United Kingdom ............ 47129/77

[51] Int. Cl.³ .................... A61M 15/00; A62B 18/00
[52] U.S. Cl. ........................ 128/201.23; 128/201.28
[58] Field of Search .................. 128/200.29, 201.15, 128/202.26, 203.16, 204.29, 205.11, 205.22, 201.22, 201.23, 201.29, 202.11, 202.27

[56] References Cited

U.S. PATENT DOCUMENTS

| | | | |
|---|---|---|---|
| 2,066,706 | 1/1937 | Walters | 128/201.15 |
| 2,804,071 | 8/1957 | Johnston | 128/201.23 |
| 2,861,568 | 11/1958 | Quilter et al. | 128/201.23 |
| 3,149,632 | 9/1964 | Colley | 128/201.23 |
| 3,456,642 | 7/1969 | Cupp | 128/204.29 |
| 3,680,555 | 8/1972 | Warncke | 128/201.15 |
| 3,768,466 | 10/1973 | Johnson | 128/204.29 |
| 3,927,668 | 12/1975 | Raschke | 128/201.23 |
| 4,148,311 | 4/1979 | London et al. | 128/204.29 |

Primary Examiner—Harold J. Tudor
Attorney, Agent, or Firm—Cushman, Darby & Cushman

[57] ABSTRACT

For or attached to an aircrew respirator of the type having a hood with a cowl and visor enveloping at least the face of a user and a mask for delivering respirable air and oxygen to the user, means for maintaining a gas pressure within the hood but outside the mask greater than that outside the hood and means for preventing misting of a visor portion thereof, a non-respirator borne apparatus for controlling and supplying the required amounts of clean oxygen and air to the respirator in all conditions. The apparatus comprises a control unit and ducting assembly, the ducting being adapted for communication between the unit and the respirator and the control unit having a normal hood cavity supply facility, a normal mask breathable gas supply facility, and being mountable on the person remote from the respirator.

23 Claims, 5 Drawing Figures

RESPIRATORS

The present invention relates to the supply of respirable gas to respirators, particularly respirators for use by aircrew.

Co-pending U.S. patent application Ser. No. 116,028 describes such a respirator. It is in the form of a hood comprising a hood cowl and a visor both made of material impervious to the undesirable substance, attached one to another in a manner impervious to the undesirable substance and adapted to fit and envelop closely the head of a wearer, a breathing mask carried by the visor and permitting gas to be supplied to the interior of the hood outside the mask at a greater than local environmental pressure, and seal means for preventing atmosphere outside thereof from reaching the interior of the hood via the neck aperture thereof.

By the present invention is provided apparatus for supplying respirable gas to a respirator such as that described in co-pending U.S. Ser. No. 116,028.

According to the present invention apparatus for supplying gas to a respirator of the type having a hood with a cowl and visor adapted to envelop at least the face of a user and a mask for delivering respirable gas to the user, means for maintaining a gas pressure within the hood but outside the mask greater than that outside the hood and for preventing misting of at least a portion of the visor, comprises a control unit including an air supply manifold and mountable on the person remote from the respirator, a respirable air supply duct connected into the air supply manifold, a mask supply duct connected to the air supply manifold and adapted for connection to the respirator mask, a hood supply duct connected to the air supply manifold and adapted for connection to the respirator hood cavity external to the mask, and a non-return valve in the hood supply duct and permitting therein in use only flow of gas from the air supply manifold to the hood, the total capacity of the mask supply duct and the air supply manifold being such that if a distinct constant flow oxygen facility is provided ducting oxygen to the interior of the mask supply duct sufficient oxygen can be stored in the mask supply duct and the air supply manifold between inspirations to ensure on inspiration a predetermined minimum within a range of partial pressures of oxygen in the respirable gas and surplus oxygen can enter the hood supply duct during prolonged non-inspiration.

In a simple embodiment of the invention, for use by for example such low altitude aircrew as helicopter crew the control unit may simply provide a bifurcation of a breathable gas supply, such as filtered blown air from a local environment, into a hood cavity supply duct and a mask supply duct. As described in the co-pending patent application U.S. Ser. No. 116,028, the hood cavity gas supply may be directed by suitable vanes or diffuser means to wash across the visor interior for demisting purposes whilst at the same time being arranged to ensure a pressure within the hood cavity greater than the environmental pressure outside it but less than pressures experienced within the mask during expiration.

More complex embodiments of the invention, for example those suitable for use at such altitudes that oxygen is required to supplement or replace breathing air, may also have an oxygen supply facility and this may be arranged to provide an emergency breathing gas supply and an emergency hood cavity supply facility.

According to a feature of the invention therefor, the apparatus may comprise: a control unit including an air supply manifold and mountable on the person remote from the respirator, a respirable air supply duct connected into the air supply manifold, a mask supply duct connected to the air supply manifold and adapted for connection to the respirator mask, a hood supply duct connected to the air supply manifold and adapted for connection to the respirator hood cavity external to the mask, a non-return valve in the hood supply duct and permitting therein in use only flow of gas from the air supply manifold to the hood, a mask oxygen supply duct having an exit within the mask supply duct and adapted for connection to a constant flow source of oxygen, and a restriction in the mask oxygen supply duct for controlling the flow of oxygen therethrough, the total capacity of the mask supply duct and the air supply manifold being such that sufficient oxygen can be stored therein between inspirations to ensure on inspiration a pre-determined minimum within a range of partial pressures of oxygen in the respirable gas and surplus oxygen can enter the hood supply duct during prolonged non-inspiration.

It is preferred that a maximum of two distinct ducts lead from the control unit to the respirator. Thus the oxygen supply facility may include a mask oxygen supply duct contained within the mask supply duct, and the emergency hood cavity supply duct may include an emergency hood gas supply duct contained within the hood supply duct.

It is preferred, in the context of use of the present apparatus in an aircraft adapted to fly at high altitude, that respiratory oxygen is supplied at a constant rate, that is that the oxygen supply is a constant flow as distinct from a demand system. It is supplied at a pressure slightly above cabin ambient which facilitates the storing of oxygen between inspirations in the control unit air manifold and the mask supply duct. The mask oxygen supply duct preferably terminates just upstream of the connection of the mask supply duct to the respirator, whereby during non-inspiration portions of a user's breathing cycle oxygen can in use spill back down the mask supply duct and even into the manifold. This ensures that at every inspiration the available oxygen is taken first and then reaches the lungs. This arrangement has the further advantage that in prolonged non-inspiration build-up of oxygen pressure can be prevented by the oxygen being allowed to be entrained in the hood cavity gas.

A suitable capacity of the mask supply duct and the control unit air manifold in combination is about 150 ml, and such a capacity can readily be provided in flexible corrugated ducting when the assembly is so arranged that the control unit is mountable in the region of the user's chest.

The hood cavity gas supply duct is preferably of smaller diameter than the mask supply duct. This, together with lightly biassing closed the non-return valve in the hood supply duct and the siting of that valve approximate the control unit air manifold outlet, the use of diffusers in the hood configured to direct hood gas over that portion of the visor to be maintained mist free, the normal volume of the visor space and the use of a hood outlet valve which is biassed closed, can be contrived to control the relative hood and mask gas supply quantities, to ensure maintenance within the hood of a pressure greater than that outside the hood, to ensure a continuous as distinct from intermittent throughput of visor demist air even at high respiratory levels, and to set the datum safety pressure in the compensation of the mask outlet valve. Both ducts may be formed of flexible corrugated reinforced butyl rubber material. Cords may be employed between the respirator connections and the control unit outlets to prevent the ducts from being over-tensioned or over-extended.

When a respirator is to be used at altitude it is preferable that a mixture of air and oxygen is supplied which varies so that the ground level partial pressure of oxygen is at least maintained. In aircraft it is customary to take the respirable air from the cabin which in turn is supplied from an aircraft engine compressor and thereby forms a capacitor for such air. The cabin air pressure is arranged to drop with altitude from normal ground level pressure at a rate about one third that outside, down to a certain minimum. Apparatus in accordance with the invention is therefore advantageously arranged to supply a mixture of air and oxygen which varies in accordance with cabin altitude and to cater for loss of cabin pressure at high altitude. For this purpose a filter/blower unit may be arranged to supply clean respirable air at a constant pressure differential with respect to cabin ambient pressure, and oxygen is arranged to be supplied from an oxygen reservoir at constant pressure.

As described above, the mask oxygen supply duct may contain a restrictor for metering the oxygen supply so that the proportion of oxygen in the gas available to the user for breathing will increase with altitude. This also allows for loss of cabin pressure, at high altitude, to be catered for by a barometric switch controlling the supply of clean breathing air so that the whole volume of this supply, that is the control unit air manifold volume, the mask supply duct connecting the manifold and the mask, and the ducting from the breathing air supply to the manifold, could then become available for storing oxygen from the oxygen supply. The associated pressure drop in that breathing air supply volume ensures augmentation of the oxygen flow through the metering restriction. Entry of oxygen into the normal hood cavity supply duct can be resisted by the biassing of the non return valve in the hood cavity supply duct.

Clearly sudden loss of the breathing air supply due perhaps to operation of a barometric switch is likely to result in rapid misting of the visor, and the emergency head cavity oxygen supply is intended to cater for this: the emergency hood supply duct may be connected via a control and an oxygen manifold on the control unit, the oxygen manifold being also connected to the mask oxygen supply duct. The emergency hood cavity supply flow may be kept to the minimum necessary by means of a restrictor.

For use by aircrew normally seated in ejector seats the oxygen and breathing air supply ducts may lead from a personal equipment connection unit mounted on the ejector seat. Typically all of the communications between an aircrewman and an aircraft, for example electrical intercommunication leads, anti-G and liquid conditioning ducts, and breathing air and oxygen ducts, pass via a personal equipment connector unit mounted on the ejector seat. The unit may comprise an aircraft portion, a seat mounted portion and a man portion, the aircraft portion carrying all the supplies to the seat portion, and detachable from the seat portion upon ejection of the seat from the aircraft, and the man portion being detachable from the seat portion upon seatman separation. Such a system enables an emergency oxygen supply to be carried on the seat, connected into the personal equipment connector seat portion, and arranged to be available upon detachment of the aircraft portion. In a preferred embodiment of the invention the breathing air supply duct and the oxygen supply duct which form inputs to the control unit pass via the personal equipment connector unit, with the seat mounted oxygen supply available to the oxygen supply duct.

As it will normally be the case that upon emergency exit from the aircraft in the air, eg by ejection, the breathing air supply duct will become open to the atmosphere, this is to say that in the above mentioned preferred embodiment detachment of the personal equipment connection aircraft portion from the seat portion and of the man portion therefrom the said duct will not be closed off, it may be desirable to incorporate means for ensuring that the wearer of the unit upon entering water, eg the sea, does not suck water up the breathing supply ducts.

According to a yet further feature of the invention the apparatus incorporates an anti-drowning facility whereby the mask supply duct, together with the anti-tensioning cord and the breathing oxygen supply tube if therewithin, can be manually disconnected from the respirator mask at the mask inlet. This may be accomplished with bayonet or quick-start screw thread fittings, suitable seals and adaptors, and perhaps a ferrule anchoring the anti-tensioning cord and the breathing oxygen tube outlet.

For use by an aircrewman on the ground, for example when going to and from his aircraft, a portable battery driven air filter-blower unit may be employed, detachable and connectable into the apparatus of the invention at for example the control unit breathing air inlet or the personal equipment connector.

Apparatus in accordance with the invention and for use by aircrew, will now be described by way of example, with reference to the accompanying drawings, of which:

Figure 1:
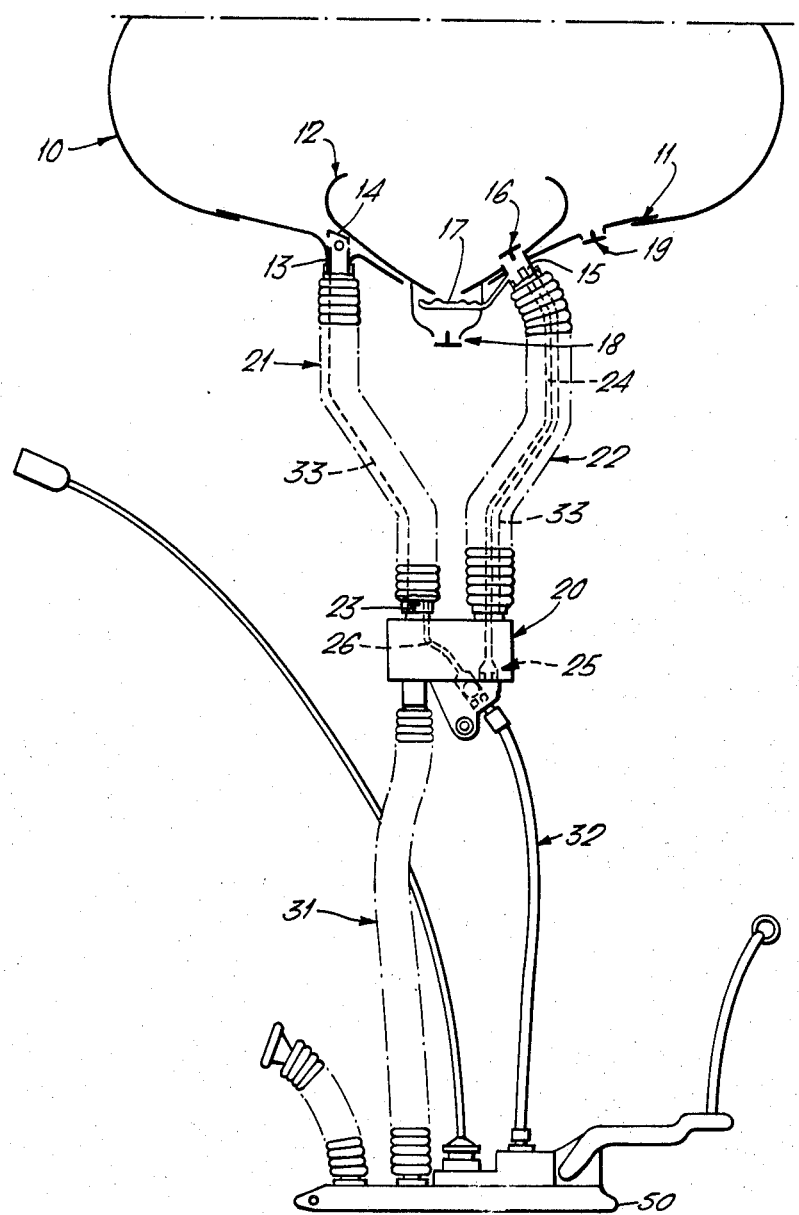
FIG. 1 is a schematic diagram of the apparatus.

FIG. 1 shows part of a respirator comprising a hood 10 having a face plate/visor member 11 carrying an oronasal mask 12. The respirator has a hood cavity gas inlet 13 with an associated gas directing diffuser 14, and a mask gas inlet 15 controlled by a non-return valve 16. The mask has an expiratory outlet controlled by a non-return valve 17 compensated by inlet pressure and by a final non-return valve 18 lightly biassed closed. The visor member 11 carries a hood outlet non-return valve 19 so biassed closed as to maintain a sensible positive pressure within the hood in use. The respirator is otherwise substantially as described in co-pending patent application U.S. Ser. No. 116,028.

The apparatus for supplying gases to the respirator comprises a control unit 20 mainly consisting of an air manifold with a breathing air inlet and one outlet for hood cavity air and another outlet for mask air. A hood cavity supply duct (hood hose) 21 connects the unit 20 with the respirator inlet 13 while a mask supply duct (mask hose) 22 connects the unit 20 with the mask inlet 15. Flow from the hood hose 21 into the air manifold is prevented by a non-return valve 23 lightly biassed closed.

Figure 2:
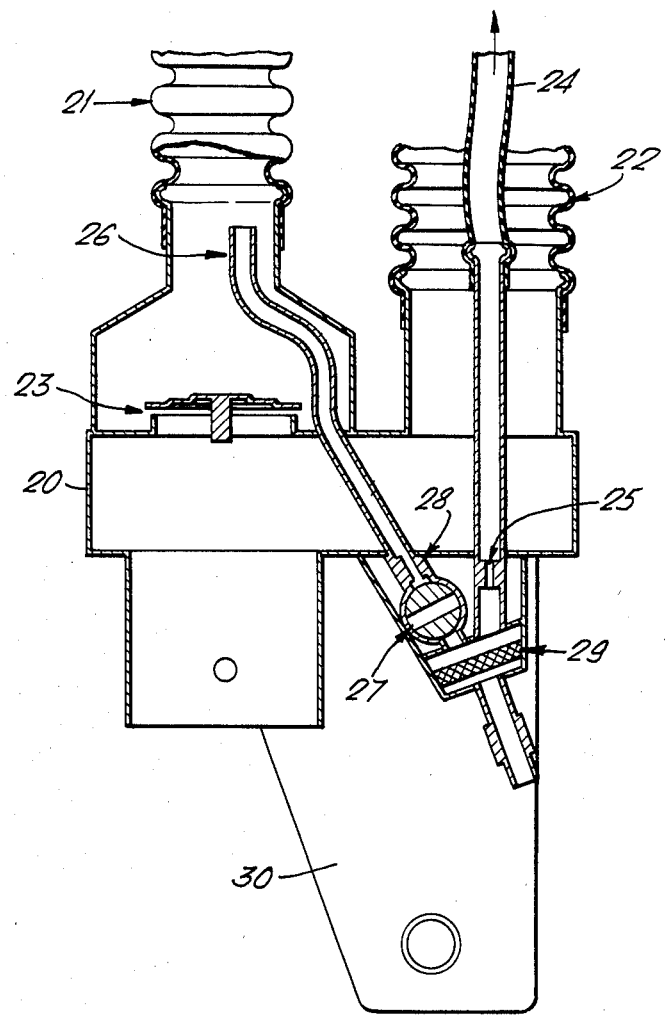
FIG. 2 is a detail schematic diagram of a control unit to the apparatus.

The unit 20 (see FIG. 2) also has an oxygen manifold having an inlet for oxygen under pressure, an outlet for breathing oxygen and an outlet for emergency hood cavity oxygen. A flexible mask oxygen supply tube 24 is connected to the breathing oxygen manifold outlet, is contained within the mask hose 22 and is open-ended just short of the mask inlet 15. At the manifold outlet the tube 24 contains a restriction 25. An emergency hood cavity supply tube 26 communicates the oxygen manifold hood cavity supply outlet, via a cock 27 and a restrictor 28, with the hood hose 21 downstream of the non-return valve 23. A filter 29 divides the oxygen manifold and protects both restrictor orifices. A lug 30 is used to mount the unit 20 on a garment in the region of the wearer's chest.

The total capacity of the hood hose 21 and the control unit air manifold is such that sufficient oxygen can be stored therein between inspirations to ensure on inspiration a predetermined minimum within a range of partial pressure of oxygen in the respirable gas and surplus oxygen can enter the hood hose 21 during prolonged non-inspiration. Typically it is about 150 ml.

An air supply hose 31 (see FIG. 1) is connected to the air manifold inlet and an oxygen supply hose 32 is connected to the oxygen manifold inlet. The hoses 21, 22, and 31 are formed of corrugated reinforced rubber and cords 33 extend between anchorages at the respirator inlets and the unit 20 outlets to prevent over-tensioning of the hoses 21 and 22. The hood hose 21 is of smaller bore than the mask hose 22.

Figure 3:
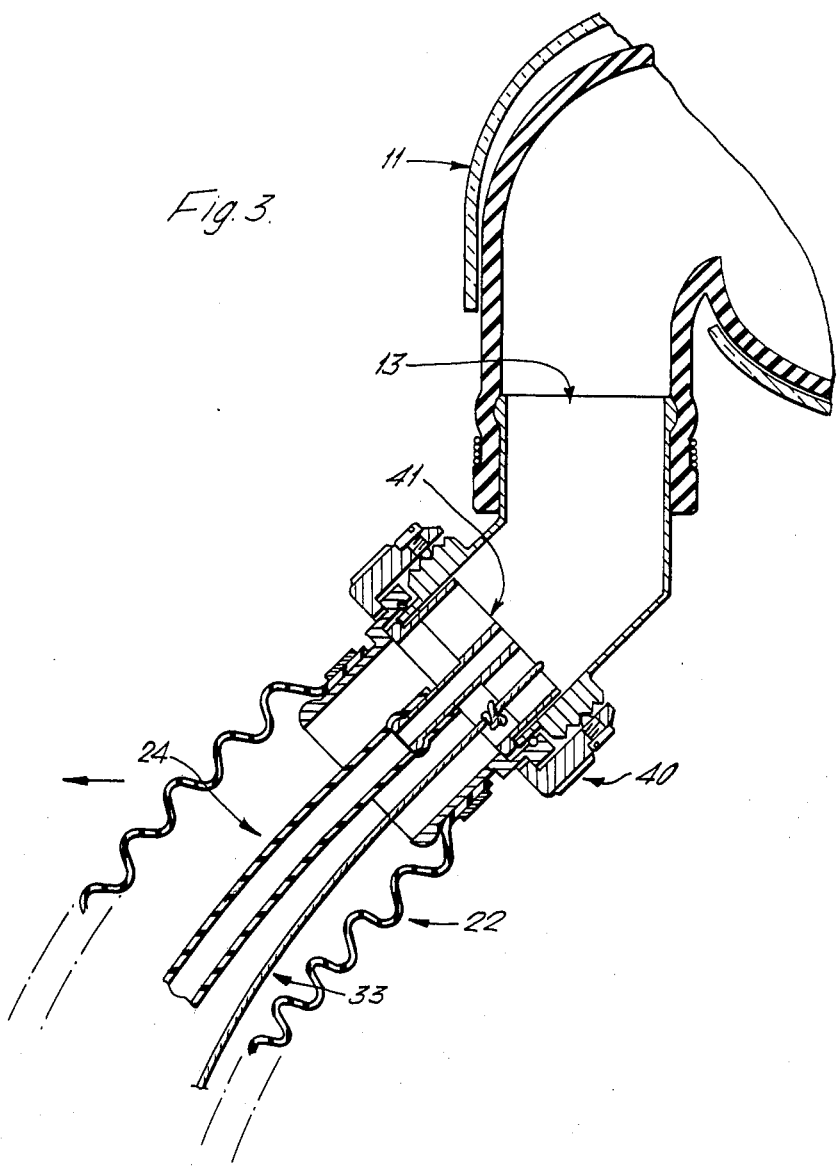
FIG. 3 is a detail schematic diagram of an antidrowning facility to the apparatus.

As illustrated particularly in FIG. 3 the apparatus has an anti-drowning facility to allow a wearer to avoid sucking up water through the breathing air supply when he is in water. Sited at the mask inlet 15 the facility comprises a securing nut 40 which engages on a quick or multi-start screw thread formed on the inlet part 15 and arranged to retain an outlet fitting to the hose 22, a carriage member 41, and suitable seals. The member 41 carries a ferrule which supports the open end of the breathing oxygen supply tube 24 and provides an anchorage for the cord 33.

Figure 4:
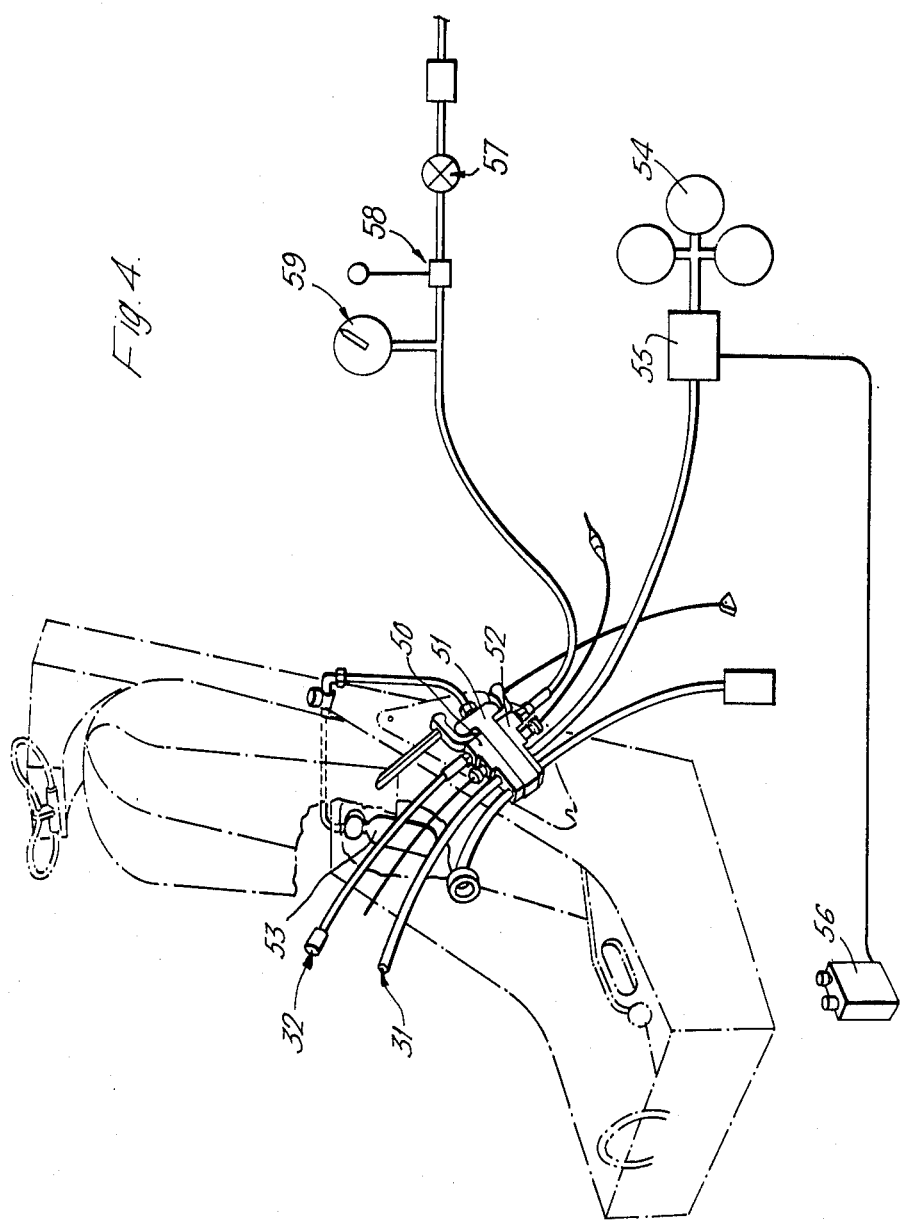
FIG. 4 is a detail schematic diagram of a personal equipment connector facility to the apparatus associated with an ejector seat.

The air and oxygen supply hoses 31 and 32 are connected to supplies of these gases via a man personal equipment connector portion 50 (see FIG. 4) carrying all aircraft/aircrew communication lines including also liquid conditioning suit and anti-G suit supplies and intercommunication leads. As shown in FIGS. 1 and 4 the connector 50 is detachably part of a personal equipment connector unit which comprises also a seat mounted seat portion 51 and an aircraft portion 52. An emergency oxygen reservoir 53 is mounted on the seat and connected into the oxygen supply via the seat portion 51. The portion 51 carries a cock (not shown), manually overridable, by which emergency oxygen supply can be substituted for normal. The air supply is derived from the aircraft cabin by a filter 54 and a blower 55 unit directed by a controller 56 to supply the air at a pressure a little above that in the aircraft cabin, the difference being substantially constant. The blower unit 55 incorporates a barometric switch which stops the supply if cabin pressure drops below a prescribed value. The oxygen supply originates in aircraft mounted reservoirs and also passes, via a cock 57, a flow sensor 58 and a pressure gauge 59, to the aircraft portion 52 of the connector unit.

Figure 5:
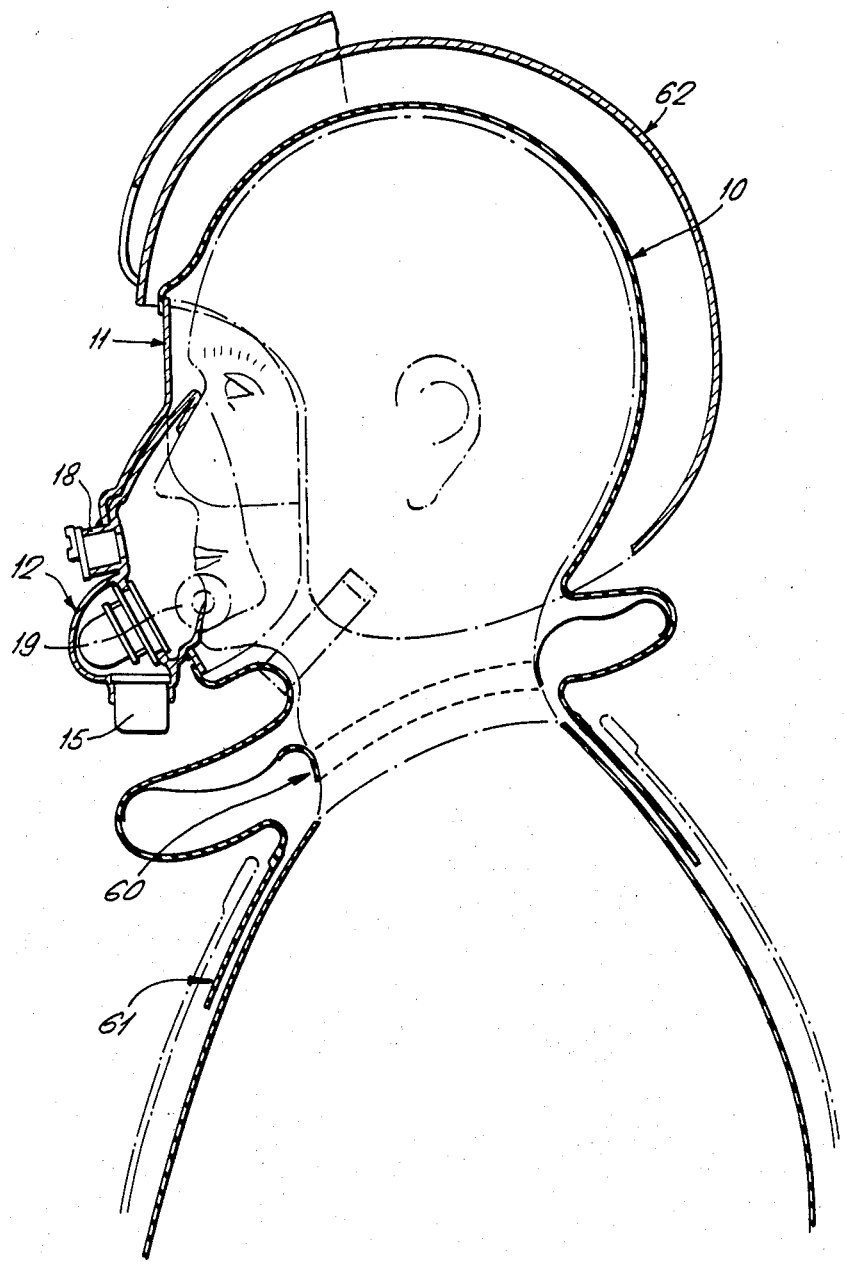
FIG. 5 is a schematic diagram illustrating aircrew head protection apparatus.

As described above the personal equipment connector unit does not form of itself part of the present invention. Likewise the respirator depicted in FIG. 5 does not of itself form part of the present invention, being the subject of co-pending patent application U.S. Ser. No. 116,028. It is described briefly here however the better to enable understanding of the present invention. The respirator comprises the neoprene hood 10 arranged closely to envelop a user's head, the visor member 11 sealed to the hood and closely covering the user's whole face, and the oronasal mask 12 carried by the visor 11. The respirator has a neck seal 60 and an overhanging skirt portion 61, and fits beneath a standard aircrew helmet 62.

For operation of the apparatus described above an aircrewman is installed in an ejector seat in an aircraft. The unit 20 is mounted on his clothing in the region of his chest by the lug 30 and connector unit 50, 51, 52 is in operational assembly. During operation air is supplied via the filter 54 and the connector unit 50, 51, 52 and the air supply hose 31 to the air manifold of the control unit 20. Oxygen is supplied via the cock 57 and gauges 58 and 59, the connector unit 50, 51, 52 and the oxygen hose 32 to the oxygen manifold of the control unit 20. Whereas the air is supplied, by the blower 55 under control of the unit 56, at a pressure which varies with the pressure in the aircraft cabin but at a constant positive pressure difference with respect thereto, the oxygen is supplied at a constant positive pressure (which is reduced to that required for breathing by the restrictor 25).

From the air manifold air passes along the hood hose 21 and the inlet 13 to the hood compartment where, directed by the diffuser 14, it demists the visor ahead of the wearer's eyes while at the same time, by virtue of the neck seal 60 and the biassing of the hood outlet valve 19 maintaining a positive pressure difference between the hood interior and its exterior. Air also passes from the manifold along the mask hose 22 during the inspirator phase of the wearer's breathing cycle.

From the oxygen manifold (where it is filtered at 29) oxygen passes via the restrictor 25 and the tube 24 to emerge in the mask inlet 15 just ahead of the non-return valve 16. During non-inspiratory parts of the breathing cycle the oxygen, the delivery of which by virtue of the restrictor 25 is only modified by the pressure difference between manifold air and the oxygen supply and therefore increases with altitude, displaces air back down the mask hose 22 and into the air manifold of the unit 20. The air at this time is all passing along the hood hose 21. When the user commences inspiration and the valve 16 opens the first part of the inspired volume of gas is substantially entirely oxygen, only then followed by air carrying metered oxygen. Apart from ensuring that the greater part of the oxygen reaches the lungs of the user the utility of a capacitor system in this way to permit intermittent and necessarily varying demand on a constant flow is also that it minimises pressure fluctuations within the mask inlet so that the compensation to the mask exit valve 17 does not vary deleteriously.

Exhaled gases leave the mask via the valves 17 and 18.

In the event of loss of cabin pressure at altitude, when pressure falls to that outside and below the prescribed threshold, operation of the barometric switch on the blower unit 56 stops the air supply so that the user can breathe 100% oxygen as required. As this is most likely rapidly to bring about misting of the visor, operation of the emergency demist control 27 will pass a metered amount of oxygen into the hood hose 21.

The hood hose non-return valve 23, besides ensuring that the emergency demist oxygen reaches its proper destination, together with the diffuser 14, enables the hood hose 21 to provide a capacitor to attenuate respirator pressure and demist supply gas pressure variations during the respiration cycle.

If a fault develops in the air supply the user can switch off the blower controller 56 and draw 100% oxygen. If normal oxygen supply should fail he can manually operate the personal equipment connector portion 51 cock to draw emergency oxygen from the seat-mounted supply 53.

In the event of and during ejection the personal equipment connector aircraft portion 52 is automatically detached from the portion 51, that action operating a valve in the line from the seat-mounted emergency oxygen supply 53 and at the same time blanking off the normal oxygen inlet to the portion 51. This emergency oxygen supply provides for breathing and demisting requirements while the aircrewman is attached to his seat, a period which is arranged to last until he has reached an altitude at which there is breathable air from the point of view of the partial pressure therein of oxygen.

Upon seat-man separation the connector portion 50 is automatically detached from the portion 51 and the wearer breathes atmospheric air via the air supply hose 31, the oxygen hose 32 being automatically blanked at the portion 50. Preferably with the emergency demist cock 27 off the wearer can obtain a measure of demisting flow by compressing and extending the hood hose 21 through operation in consort of the non-return valves 19 and 23.

If he lands in water it is likely that the unit 20, if not the portion 50, will be under the water. He can prevent water being sucked up the mask hose 22 by releasing the nut 40 of the anti-drowning facility. The hose 22 and the ferrule 41 etc will detach from the mask inlet 15, which is so sited as to be unlikely to lie beneath the water. For this period it is unlikely that he will be able to demist his visor, but as his survival dinghy is attached to him by cord (the period of reliance on this flotation stole is intended to be short) he is expected to be able to pull the dinghy to him, right it if necessary, and enter it, despite impaired vision. Once in the dinghy the hood hose 21 can be manipulated again or the respirator as a whole doffed.

It will be noted that only the hood and mask hoses 21, 22 have anti extension cords 33 which prevent their being pulled off the various ports. Such cords are not necessary on the air and oxygen leads 31, 32. Besides it can be desirable to be able to detach the air supply hose 31 from the unit 20 and substitute a supply from a portable or mobile clean air supply unit during normal passage to and from an aircraft.

We claim:

1. Apparatus for supplying respirable gas to a respirator of the type having a hook with a cowl and a visor adapted to envelop at least the face of a user and a mask for delivering respirable gas to the user, means for maintaining a gas pressure within the hood but outside the mask greater than that outside the hood and for preventing misting of at least a portion of the visor, said apparatus comprising:
    a control unit including an air supply manifold and mountable on the person and mounted remote from the respirator,
    a respirable air supply duct connected into said air supply manifold,
    a flexible mask supply duct connected to said air supply manifold and adapted for connection to the respirator mask,
    a flexible hood supply duct connected to said air supply manifold and adapted for connection to the respirator hood cavity external to the mask,
    a non-return valve in said hood supply duct and permitting therein in use only flow of gas from said air supply manifold to the hood,
    a flexible mask oxygen supply duct having an exit within said mask supply duct and adapted for connection to a constant flow source of oxygen, and
    a restriction in said mask oxygen supply duct for controlling the flow of oxygen therethrough,
    the total capacity of said mask supply duct and said air supply manifold being such that sufficient oxygen can be stored therein between inspirations to ensure on inspiration a predetermined minimum thereof within a range of partial pressures of oxygen in the respirable gas and surplus oxygen can enter said hood supply duct during prolonged non-inspiration.

2. Apparatus as claimed in claim 1 and wherein said hood supply duct is of smaller cross sectional area than said mask supply duct.

3. Apparatus as claimed in claim 1 and wherein said hood supply duct and said mask supply duct are formed of corrugated reinforced butyl rubber material.

4. Apparatus as claimed in claim 1 and having cords extending within said mask supply duct and said hood supply duct from said control unit to the connections to the respirator operative to prevent said ducts from being over-tensioned.

5. Apparatus as claimed in claim 1 and wherein said mask oxygen supply duct is housed within said mask supply duct.

6. Apparatus as claimed in claim 1 and wherein said non-return valve in said hood gas supply duct is sited approximate said control unit, whereby said hood supply duct can be manipulated to pump air to the hood.

7. Apparatus as claimed in claim 1 and wherein said mask oxygen supply duct is connected to an oxygen supply manifold on the control unit and said oxygen supply manifold is adapted for connection to a constant flow source of oxygen.

8. Apparatus as claimed in claim 7 and having an oxygen reservoir a constant pressure supply regulator connected to said oxygen reservoir, an oxygen supply duct connecting said oxygen reservoir with said oxygen manifold.

9. Apparatus as claimed in claim 8 and for use by an aircrewman in an ejector seat and wherein said oxygen and air supply ducts comprise a personal equipment connector associated with an ejector seat personal equipment connector unit.

10. Apparatus as claimed in claim 9 and having a seat-mounted emergency oxygen reservoir.

11. Apparatus as claimed in claim 1 and having an emergency hood gas supply duct terminating within said hood supply duct downstream of said non-return valve.

12. Apparatus as claimed in claim 11 and wherein said emergency hood gas supply duct is contained within said hood supply duct.

13. Apparatus as claimed in claim 12 and wherein said control unit comprises an oxygen supply manifold and an emergency hood gas control cock, said mask oxygen supply duct and said emergency hood gas supply duct via said control cock being connected to said oxygen supply manifold.

14. Apparatus as claimed in claim 1 and wherein said mask oxygen supply duct exits just upstream of the connection for said mask oxygen supply duct to the mask whereby during non-inspiration portions of a user's breathing cycle oxygen can in use spill back down said mask oxygen supply duct and even into said manifold.

15. Apparatus as claimed in claim 13 and wherein said emergency hood supply duct contains a restriction.

16. Apparatus as claimed in claim 1 and wherein said control unit is mountable in the region of the user's chest.

17. Apparatus as claimed in claim 1 wherein said non-return valve is lightly biassed closed.

18. Apparatus as claimed in claim 1 and wherein the total capacity of said mask supply duct and said air supply manifold is 150 ml.

19. Apparatus as claimed in claim 1 and adapted for use by an aircrewman and operative to supply a mixture of air and oxygen which varies in accordance with cabin altitude and to cater for loss of cabin pressure at high altitude.

20. Apparatus as claimed in claim 1 and having a filter/blower unit connected to said air supply duct and operative to supply clean respirable air at a constant pressure differential with respect to ambient pressure.

21. Apparatus as claimed in claim 1 and having a barometric switch operative to control the supply of breathing gas whereby the volume of said air supply duct can also become available for storing oxygen from said mask oxygen supply duct.

22. Apparatus as claimed in claim 1 and wherein said mask supply duct has an anti-drowning connector whereby said mask supply duct can be manually disconnected from said mask at the mask.

23. Apparatus for supplying respirable gas to an aircrew respirator of the type having a hood with a cowl and visor adapted to envelop at least the face of a user and a mask for delivering respirable gas to the user, means for maintaining a gas pressure within the hood but outside the mask greater than that outside the hood and for preventing misting of at least a portion of the visor, said apparatus comprising:

a control unit including an air supply manifold and an oxygen supply manifold and mountable in the region of the aircrewman's chest, a flexible respirable air supply duct connected into said air supply manifold and adapted for connection to a filter/blower unit, a flexible mask supply duct connected to the said supply manifold and adapted for connection to the respirator mask, a flexible hood supply duct connected to said air supply manifold and adapted for connection to the respirator hood cavity external to the mask, a non-return valve lightly biassed closed in said hood supply duct approximate said control unit and permitting therein in use only flow of gas from said air supply manifold to the hood, a flexible oxygen supply duct connected to said oxygen supply manifold, a flexible mask oxygen supply duct contained within said mask supply duct, connected to said oxygen supply manifold, and terminating with an exit just upstream of the connection for said mask supply duct to the mask, a restriction in said mask oxygen supply duct for controlling the flow of oxygen therethrough, a flexible emergency hood gas supply duct contained within said hood supply duct connected to said oxygen supply manifold and having a restrictor therewithin and an exit in said hood supply duct downstream of said non-return valve, a cock on said control unit for determining whether oxygen shall flow in said emergency hood gas supply duct, and an anti-drowning facility whereby said mask supply duct can be manually disconnected from the respirator mask at the connection thereto, the total capacity of said mask supply duct and said air supply manifold being such that sufficient oxygen can be stored therein between inspirations to ensure on inspiration a predetermined minimum within a range of partial pressures of oxygen in the respirable gas and surplus oxygen can enter said hood supply duct during prolonged non-inspiration.

* * * * *